United States Patent
Wu et al.

(10) Patent No.: US 12,067,710 B2
(45) Date of Patent: Aug. 20, 2024

(54) METHOD AND APPARATUS FOR SPOT-CHECKING VISUAL INSPECTION SYSTEM

(71) Applicant: CONTEMPORARY AMPEREX TECHNOLOGY CO., LIMITED, Ningde (CN)

(72) Inventors: Qian Wu, Ningde (CN); Jiwei Chen, Ningde (CN); Guannan Jiang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/296,995

(22) Filed: Apr. 7, 2023

(65) Prior Publication Data

US 2024/0070849 A1 Feb. 29, 2024

Related U.S. Application Data

(63) Continuation of application No. PCT/CN2022/115748, filed on Aug. 30, 2022.

(51) Int. Cl.
*G06T 7/00* (2017.01)

(52) U.S. Cl.
CPC .... *G06T 7/001* (2013.01); *G06T 2207/30108* (2013.01)

(58) Field of Classification Search
CPC ............ G06T 7/001; G06T 2207/30108
USPC ................................... 382/141, 100
See application file for complete search history.

(56) References Cited

U.S. PATENT DOCUMENTS

| 11,657,494 | B1* | 5/2023 | Zhao | G06V 10/60 |
| | | | | 348/106 |
| 2022/0092359 | A1 | 3/2022 | Zhang et al. | |
| 2022/0172483 | A1 | 6/2022 | Suarez Garcia et al. | |
| 2023/0138821 | A1* | 5/2023 | Sessinghaus | G06T 7/001 |
| | | | | 382/141 |
| 2023/0251212 | A1* | 8/2023 | Wagner | G06T 7/73 |
| | | | | 382/141 |

FOREIGN PATENT DOCUMENTS

| CN | 109978875 A | | 7/2019 |
| CN | 111640091 A | | 9/2020 |
| CN | 114359253 A | | 4/2022 |
| CN | 115147363 A | | 10/2022 |
| KR | 102261757 | * | 6/2021 |
| WO | 2022101909 A1 | | 5/2022 |

OTHER PUBLICATIONS

The World Intellectual Property Organization (WIPO) International Search Report and Written Opinion for PCT/CN2022/115748 Jan. 28, 2023 20 pages (including English translation).

* cited by examiner

*Primary Examiner* — Sheela C Chawan
(74) *Attorney, Agent, or Firm* — ANOVA LAW GROUP, PLLC (57) ABSTRACT

A spot-checking method for a visual inspection system includes obtaining a plurality of to-be-inspected images, inspecting the plurality of to-be-inspected images to obtain defect types and/or parameters of a target object in the plurality of to-be-inspected images, and confirming availability of the visual inspection system based on the defect types and/or the parameters.

20 Claims, 4 Drawing Sheets

METHOD AND APPARATUS FOR SPOT-CHECKING VISUAL INSPECTION SYSTEM

CROSS-REFERENCE TO RELATED APPLICATION

This application is a continuation of International Application No. PCT/CN2022/115748, filed on Aug. 30, 2022, the entire content of which is incorporated herein by reference.

TECHNICAL FIELD

This application relates to the field of contactless inspection, and in particular, to a method and apparatus for spot-checking a visual inspection system.

BACKGROUND

A visual inspection system can replace manual inspection to improve production efficiency and product quality for factories and enterprises. Nowadays, the visual inspection system has been widely used in various industries. For example, the visual inspection system may be used in the entire process of battery manufacturing. An image of a battery is obtained through the hardware of the visual inspection system, and then defect detection is performed on the image by using an algorithm in the visual inspection system. However, various unexpected factors may occur in the hardware and algorithm of the visual inspection system, and the availability or reliability of the hardware and algorithm of the visual inspection system needs to be spot-checked regularly to ensure accuracy of visual inspection results.

Therefore, a method for spot-checking availability of a visual inspection system is urgently needed to ensure the accuracy of the inspection results of the visual inspection system.

SUMMARY

This application provides a method and apparatus for spot-checking a visual inspection system. The method and apparatus can inspect whether an algorithm and hardware of the visual inspection system are available, and give an alert or report an error in time when the algorithm or hardware is not available, thereby ensuring accuracy of inspection results of the visual inspection system.

According to a first aspect, this application provides a method for spot-checking a visual inspection system, including: obtaining a plurality of to-be-inspected images; inspecting the plurality of to-be-inspected images to obtain defect types and/or parameters of a target object in the plurality of to-be-inspected images; and confirming availability of the visual inspection system based on the defect types and/or parameters.

In the technical solution of this application, the defect types and parameters of the target object in a plurality of to-be-inspected images are inspected by using a visual inspection system, so as to obtain the corresponding defect type inspection result and parameter inspection result. On the one hand, the accuracy or availability of the algorithm of the visual inspection system can be determined based on the defect type inspection result. On the other hand, accuracy of the data provided by the visual inspection algorithm hardware for the algorithm can be determined based on the parameter inspection result, so as to confirm the availability of the visual inspection system, and give an alert or report an error in time when the visual inspection system is not available, and ensure accuracy of the inspection result.

In some embodiments, the obtaining a plurality of to-be-inspected images includes: obtaining the plurality of to-be-inspected images from a specimen image library, where the defect types of each image in the specimen image library are known.

Compared with the images captured in real time by using the hardware of the visual inspection system, the plurality of to-be-inspected images of known defect types obtained directly from the specimen image library can avoid the impact caused by the hardware device of the visual inspection system onto the spot-check result, reduce the time of obtaining the to-be-inspected images, and in turn, improve the efficiency of spot-checking the algorithm of the visual inspection system.

In some embodiments, the inspecting the plurality of to-be-inspected images to obtain defect types and/or parameters of a target object in the plurality of to-be-inspected images includes: performing defect detection on each of the plurality of to-be-inspected images by using a defect detection algorithm in the visual inspection system, so as to obtain the defect types of the target object in each to-be-inspected image.

By inspecting the defect types of each of the plurality of to-be-inspected images, this application can determine the robustness of the defect detection algorithm comprehensively based on the defect type inspection result of the plurality of to-be-inspected images, thereby improving accuracy of spot-checking the algorithm of the visual inspection system.

In some embodiments, the confirming availability of the visual inspection system based on the defect types and/or parameters includes: confirming, if the defect types of the target object in each to-be-inspected image are identical to the known defect types, that a defect detection algorithm of the visual inspection system is available.

In the above embodiments, when the defect type inspection results of all the to-be-inspected images are identical to the known defect types, it is confirmed that the defect detection algorithm of the visual inspection system is available, thereby improving the accuracy and effectiveness of the algorithm spot-checking.

In some embodiments, the obtaining a plurality of to-be-inspected images includes: running a standard target object inspection process; and obtaining an image of the target object captured by the visual inspection system, so as to obtain the plurality of to-be-inspected images.

During running of the standard target object inspection process, all cameras and light sources in the visual inspection system can be called. By inspecting the parameters of the target object in a plurality of to-be-inspected images captured by all cameras and light sources, the availability of each camera and each light source can be determined based on the parameter inspection result, so as to confirm the availability of hardware of the visual inspection system.

In some embodiments, the target object is a battery cell or a sheet film.

In some embodiments, the inspecting, through the visual inspection system, the plurality of to-be-inspected images to obtain defect types and/or parameters of a target object in the plurality of to-be-inspected images includes: performing parameter measurement on each of the plurality of to-be-inspected images through the visual inspection system, so as to obtain the parameters of the target object in each to-be-inspected image.

Through the parameter measurement for each to-be-inspected image, a parameter measurement result of the target object in each to-be-inspected image can be obtained. The availability of the hardware corresponding to each to-be-inspected image can be determined based on the parameter measurement result of each to-be-inspected image.

In some embodiments, the parameters include a size and a grayscale of the target object.

By inspecting the size and grayscale of the target object in each to-be-inspected image, whether the camera and light source corresponding to each to-be-inspected image have changed can be inspected separately, so as to confirm the availability of the hardware of the visual inspection system.

In some embodiments, the confirming availability of the visual inspection system based on the defect types and/or parameters includes: confirming, if the parameters of the target object in each to-be-inspected image are consistent with true parameters, that hardware of the visual inspection system is available.

By checking whether the parameters of the target object in each to-be-inspected image are consistent with the true parameters, it can be determined whether the hardware corresponding to each to-be-inspected image is available, so as to confirm the availability of the hardware of the visual inspection system.

In some embodiments, the hardware includes a plurality of cameras and a plurality of light sources.

By comparing the parameter inspection result with the size and grayscale information in the true parameters, it can be determined whether the camera position of the visual inspection system and the lighting conditions of the light source have changed. In this way, the availability of the hardware of the visual inspection system is confirmed.

In some embodiments, before the obtaining a plurality of to-be-inspected images, the method further includes: receiving an instruction to select a camera; and setting the true parameters of the target object corresponding to the camera.

Based on the received instruction to select a camera, the parameters that the camera is expected to obtain (true parameters) can be set. Therefore, the true parameters are compared with the parameter measurement result of the to-be-inspected image captured by each camera, so as to determine the accuracy of the data provided for the algorithm by the camera and the light source corresponding to the camera, and in turn, confirm the availability of the hardware.

In some embodiments, the method further includes: setting a number of times that the camera is to be spot-checked.

In this way, a camera is selected, and the number of times of spot-checking the camera and the light source corresponding to the camera is set or adjusted, thereby improving the accuracy of spot-checking the hardware of the visual inspection system.

According to a second aspect, this application provides an apparatus for spot-checking a visual inspection system, including: an obtaining unit, configured to obtain a plurality of to-be-inspected images; and a processing unit, configured to: inspect the plurality of to-be-inspected images to obtain defect types and/or parameters of a target object in the plurality of to-be-inspected images, and confirm availability of the visual inspection system based on the defect types and/or parameters.

In the technical solution of this application, the defect types and parameters of the target object in a plurality of to-be-inspected images are inspected by using a visual inspection system, so as to obtain the corresponding defect type inspection result and parameter inspection result. On the one hand, the accuracy or availability of the algorithm of the visual inspection system can be determined based on the defect type inspection result. On the other hand, accuracy of the data provided by the visual inspection algorithm hardware for the algorithm can be determined based on the parameter inspection result, so as to confirm the availability of the visual inspection system, and give an alert or report an error in time when the visual inspection system is not available, and ensure accuracy of the inspection result.

In some embodiments, the obtaining unit is configured to obtain the plurality of to-be-inspected images from a specimen image library, where the defect types of each image in the specimen image library are known.

Compared with the images captured in real time by using the hardware of the visual inspection system, the plurality of to-be-inspected images of known defect types obtained directly from the specimen image library can avoid the impact caused by the hardware device of the visual inspection system onto the spot-check result, reduce the time of obtaining the to-be-inspected images, and in turn, improve the efficiency of spot-checking the algorithm of the visual inspection system.

In some embodiments, the processing unit is configured to: perform defect detection on each of the plurality of to-be-inspected images by using a defect detection algorithm in the visual inspection system, so as to obtain the defect types of the target object in each to-be-inspected image.

By inspecting the defect types of each of the plurality of to-be-inspected images, this application can determine the robustness of the defect detection algorithm comprehensively based on the defect type inspection result of the plurality of to-be-inspected images, thereby improving accuracy of spot-checking the algorithm of the visual inspection system.

In some embodiments, the processing unit is configured to: confirm, if the defect types of the target object in each to-be-inspected image are identical to the known defect types, that a defect detection algorithm of the visual inspection system is available.

In the above embodiments, when the defect type inspection results of all the to-be-inspected images are identical to the known defect types, it is confirmed that the defect detection algorithm of the visual inspection system is available, thereby improving the accuracy and effectiveness of the algorithm spot-checking.

In some embodiments, the processing unit is configured to run a standard target object inspection process, and the obtaining unit is configured to obtain an image of the target object captured by the visual inspection system, so as to obtain the plurality of to-be-inspected images.

During running of the standard target object inspection process, all cameras and light sources in the visual inspection system can be called. By inspecting the parameters of the target object in a plurality of to-be-inspected images captured by all cameras and light sources, the availability of each camera and each light source can be determined based on the parameter inspection result, so as to confirm the availability of hardware of the visual inspection system.

In some embodiments, the target object is a battery cell or a sheet film.

In some embodiments, the processing unit is configured to: perform parameter measurement on each of the plurality of to-be-inspected images through the visual inspection system, so as to obtain the parameters of the target object in each to-be-inspected image.

Through the parameter measurement for each to-be-inspected image, a parameter measurement result of the target object in each to-be-inspected image can be obtained. The availability of the hardware corresponding to each to-be-inspected image can be determined based on the parameter measurement result of each to-be-inspected image.

In some embodiments, the parameters include a size and a grayscale of the target object.

By inspecting the size and grayscale of the target object in each to-be-inspected image, whether the camera and light source corresponding to each to-be-inspected image have changed can be inspected separately, so as to confirm the availability of the hardware of the visual inspection system.

In some embodiments, the processing unit is configured to: confirm, if the parameters of the target object in each to-be-inspected image are consistent with true parameters, that hardware of the visual inspection system is available.

By checking whether the parameters of the target object in each to-be-inspected image are consistent with the true parameters, it can be determined whether the hardware corresponding to each to-be-inspected image is available, so as to confirm the availability of the hardware of the visual inspection system.

In some embodiments, the hardware includes a plurality of cameras and a plurality of light sources.

By comparing the parameter inspection result with the size and grayscale information in the true parameters, it can be determined whether the camera position of the visual inspection system and the lighting conditions of the light source have changed. In this way, the availability of the hardware of the visual inspection system is confirmed.

In some embodiments, the apparatus further includes a receiving unit. The receiving unit is configured to receive the instruction to select a camera. The processing unit is further configured to set the true parameters of the target object corresponding to the camera.

By receiving the instruction to select a camera, the parameters that the camera is expected to obtain (true parameters) can be set. Therefore, the true parameters are compared with the parameter measurement result of the to-be-inspected image captured by each camera, so as to determine the accuracy of the data provided for the algorithm by the camera and the light source corresponding to the camera, and in turn, confirm the availability of the hardware.

In some embodiments, the processing unit is further configured to set a number of times that the camera is to be spot-checked.

In this way, a camera is selected, and the number of times of spot-checking the camera and the light source corresponding to the camera is set or adjusted, thereby improving the accuracy of spot-checking the hardware of the visual inspection system.

According to a third aspect, an embodiment of this application provides an apparatus for spot-checking a visual inspection system. The apparatus includes a processor and a memory. The memory is configured to store a program. The processor is configured to call the program from the memory and run the program to perform the method for spot-checking a visual inspection system according to the first aspect or any one possible implementation of the first aspect.

According to a fourth aspect, an embodiment of this application provides a computer-readable storage medium, including a computer program. When executed on a computer, the computer program causes the computer to perform the method for spot-checking a visual inspection system according to the first aspect or any one possible implementation of the first aspect.

BRIEF DESCRIPTION OF DRAWINGS

To describe the technical solutions of the embodiments of this application more clearly, the following outlines the drawings used in the embodiments of this application. Evidently, the drawings outlined below are merely a part of embodiments of this application. A person of ordinary skill in the art may derive other drawings from the outlined drawings without making any creative efforts.

The drawings are not drawn to scale.

DETAILED DESCRIPTION OF EMBODIMENTS

The following gives a more detailed description of implementations of this application with reference to drawings and embodiments. The detailed description of the following embodiments and drawings are intended to describe the principles of this application illustratively, but not to limit the scope of this application. Therefore, this application is not limited to the described embodiments.

In the description of this application, unless otherwise specified, "a plurality of" means at least two in number; the terms such as "up", "down", "left", "right", "in", and "out" indicating a direction or a position relationship are merely intended for ease or brevity of description of this application, but do not indicate or imply that the mentioned apparatus or component is necessarily located in the specified direction or constructed or operated in the specified direction. Therefore, such terms are not to be understood as a limitation on this application. In addition, the terms "first", "second", "third", and so on are merely used for descriptive purposes, but not construed as indicating or implying relative importance. "Perpendicular" does not means exact perpendicularity, but means perpendicularity falling within an error tolerance range. "Parallel" does not mean exact parallelism, but means parallelism falling within an error tolerance range.

The directional terms appearing in the following description indicate the directions shown in the drawings, but are not intended to limit specific structures in this application. In the description of this application, unless otherwise expressly specified, the terms "mount", "concatenate", and "connect" are understood in a broad sense. For example, a "connection" may be a fixed connection, a detachable connection, or an integrated connection, and may be a direct connection or an indirect connection implemented through an intermediary. A person of ordinary skill in the art can understand the specific meanings of the terms in this application according to specific situations.

In visual inspection, image data is acquired by an industrial camera of a visual inspection system instead of human eyes. Various operations are performed on images by intelligent equipment of the visual inspection system instead of human brain to extract features of a target object, such as barcodes, defects, and the like. The inspected image data is compared with standard image data to determine whether the inspected image data is abnormal or generate other inspection results, and then the entire process of automatic recognition and inspection is completed. However, the hardware and algorithm of the visual inspection system may cause an inaccurate inspection result due to various unexpected factors, for example, changes in the camera position during visual inspection. Therefore, it is necessary to regularly spot-check the availability of the visual inspection system. Currently, the hardware of the visual inspection system is primarily spot-checked manually. When the quantity of hardware in the visual inspection system is large, the spot-check is time-consuming and not accurate enough. In addition, currently, a satisfactory solution to spot-checking an algorithm of a visual inspection system is still not available.

In view of this, an embodiment of this application provides a method for spot-checking a visual inspection system. In this method, defect types and/or parameters of a target object in a plurality of to-be-inspected images are inspected, and compared with true defect types and/or true parameters to check for consistency, so as to confirm availability of the visual inspection system. An error is reported in time when the visual inspection system is not available, so as to ensure accuracy of an inspection result.

Figure 1:
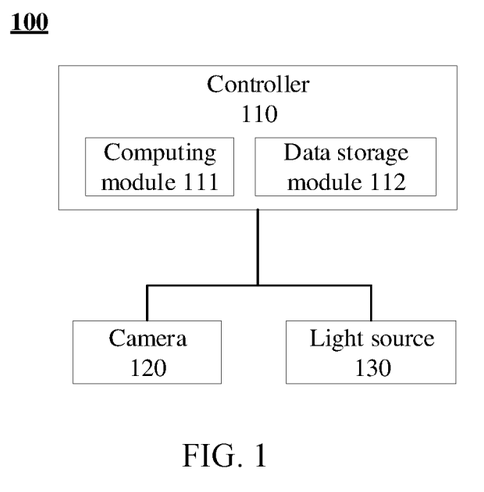
FIG. 1 is a system architecture diagram of a visual inspection system applicable in an embodiment of this application.

FIG. 1 is a system architecture diagram of a visual inspection system 100 applicable in an embodiment of this application.

As shown in FIG. 1, the visual inspection system 100 may include a controller 110, a camera 120, and a light source 130.

As shown in FIG. 1, the controller 110 may be connected to the camera 120 and the light source 130. In the controller 110, a control program may be installed to control the camera 120 and the light source 130. Optionally, in the controller 110, the control program may provide an interface for interaction with a user. The user can control the camera 120 and the light source 130 by operating the interface. The controller 110 may be a terminal, such as a mobile phone terminal, a tablet computer, a notebook computer, or the like, or may be a server, a cloud, or the like. The controller 110 may include a computing module 111 and a data storage module 112. The computing module 111 may be configured to process received input data (such as an image to be processed). When the computing module 111 performs related processing, the controller 110 may call the data, code, or the like from the data storage module 112 to perform corresponding processing, and may store the data, instructions, and the like obtained during the corresponding processing into the data storage module 112.

Optionally, in some implementations, the light source 130 may be directly connected to the controller 110, or, in some other implementations, the visual inspection system 100 may include a light source controller, and the light source 130 may be connected to the controller 110 through the light source controller.

Specifically, in the visual inspection system, the cameras 120 and light sources 130 may be plural in number, and may be distributed at different positions of a production line to acquire images of products at different positions of the production line. Optionally, the camera 120 may include various types of industrial cameras such as a line scan camera (or also known a line array camera), an area array camera, a monochrome camera, or a color camera. The light source 130 may include a light emitting diode (LED), a light strip, or other types of light sources. The specific types of the camera 120 and light sources 130 are not limited herein.

Understandably, FIG. 1 merely illustrates some devices in a visual inspection system 100. The visual inspection system 100 may further include other components in the related art in addition to the controller 110, camera 120, and light source 130 shown in FIG. 1. The specific architecture of the visual inspection system 100 is not limited herein.

In addition, the camera 120 and light source 130 may be a part of visual inspection devices in the visual inspection system 100. The visual inspection system 100 may further include other visual inspection devices such as lens, image acquisition card, image processing software, and the like in addition to the camera 120 and the light source 130.

Illustratively but not restrictively, the visual inspection system 100 shown in FIG. 1 may be a visual inspection system for batteries. The images acquired by the camera 120 together with the light source 130 may be used for inspection of a battery product on a battery production line, for example, may be used to inspect foreign matters, scratches, indentations, inferior tabs, pollution, corrosion, dents, burned tabs, inferior inkjet printing, illegible characters, and the like.

Alternatively, in other embodiments, the visual inspection system 100 shown in FIG. 1 may be a visual inspection system for another type of product. For example, the visual inspection system 100 may be a visual inspection system for processing mechanical parts, a visual inspection system for circuit boards, a visual inspection system for electronic components, or the like.

Figure 2:
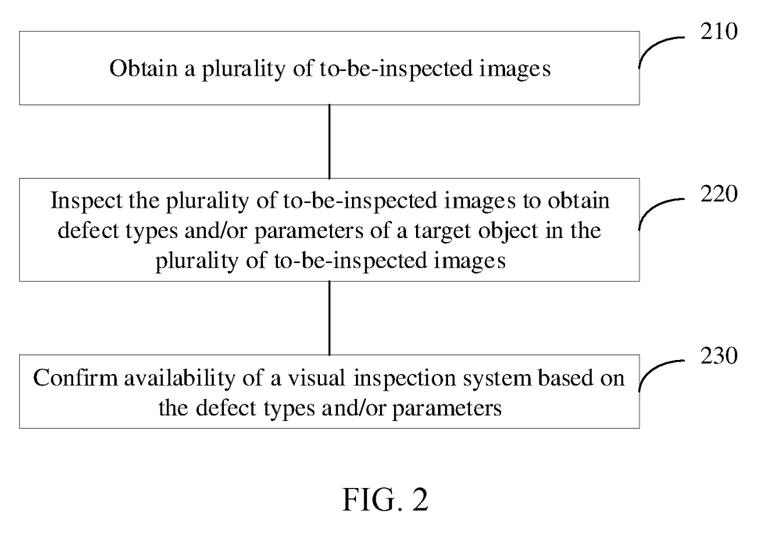
FIG. 2 is a schematic block flowchart of a method for spot-checking a visual inspection system according to an embodiment of this application.

FIG. 2 is a schematic block flowchart of a method 200 for spot-checking a visual inspection system according to an embodiment of this application.

As shown in FIG. 2, the method 200 for inspecting availability of a visual inspection device includes the following steps:

210. An apparatus for spot-checking a visual inspection system obtains a plurality of to-be-inspected images.

The plurality of to-be-inspected images are images obtained by photographing a target object by using the visual inspection system during spot-checking, or may be images stored before spot-checking the visual inspection system.

An apparatus for spot-checking a visual inspection system may serve as an upper-layer (for example, user) interface configured to control a device in the visual inspection system. Optionally, the apparatus for spot-checking the visual inspection system may include spot-check software of the visual inspection system. The spot-check software may be installed in a controller 110 shown in FIG. 1. Optionally, the device is any device in the visual inspection system. For example, the device may be a camera 120 or a light source 130 shown in FIG. 1.

220. The apparatus for spot-checking a visual inspection system inspects the plurality of to-be-inspected images to obtain defect types and/or parameters of a target object in the plurality of to-be-inspected images.

The to-be-inspected image may be inspected by using an algorithm in the visual inspection system, so as to obtain defect information of the target object in the to-be-inspected image. The defect information may include defect type and defect position information. The inspection may further produce parameter information of the target object in the to-be-inspected image. The parameter information may include size, grayscale, position, and the like of the target object.

230. The apparatus for spot-checking the visual inspection system confirms availability of the visual inspection system based on the defect types and/or parameters.

The availability of the visual inspection system includes the availability of an algorithm of the visual inspection system and the availability of hardware of the visual inspection system. The algorithm may be a defect detection algorithm. The hardware may include a camera and a light source in the visual inspection system.

To inspect the availability of the algorithm in the visual inspection system, the defect type inspection results of the target object in the to-be-inspected image may be compared with true defect types of the target object to determine whether the algorithm of the visual inspection system is available. To inspect the availability of the hardware in the visual inspection system, a to-be-inspected image captured by the hardware of the visual inspection system may be used first, and then the inspection result of the parameters of the target object in the to-be-inspected image may be compared with true parameters of the target object to determine whether the hardware of the visual inspection system is available.

In this embodiment of this application, the defect types and parameters of the target object in a plurality of to-be-inspected images are inspected by using a visual inspection system, so as to obtain the corresponding defect type inspection result and parameter inspection result. The accuracy or availability of the algorithm of the visual inspection system can be determined based on the defect type inspection result. The accuracy of the data provided by the visual inspection algorithm hardware for the algorithm can be determined based on the parameter inspection result, so as to confirm the availability of the visual inspection system, and give an alert or report an error in time when the visual inspection system is not available, and ensure accuracy of the inspection result.

According to some embodiments of this application, optionally, during the obtaining of a plurality of to-be-inspected images in step 210, the plurality of to-be-inspected images may be obtained from a specimen image library. The defect types of each image in the specimen image library are known.

The visual inspection system includes the specimen image library. The specimen image library may be stored in the data storage module 112 of the controller 110. As an example, the specimen image library may be a plurality of folders. Each folder includes a plurality of defect images. The defect types of the plurality of defect images in each folder are identical. For example, the defect type in the first folder is inferior needle pullout, and the defect type in the second folder is foreign matters in a label. That is, the defect type of all defective images in the first folder is inferior needle pullout, and the defect type of all defective images in the second folder is foreign matters in a label. Definitely, the defect types of the plurality of defective images in each folder may be different instead, without being limited in this application. During obtaining of a plurality of to-be-inspected images, one of the plurality of folders may be selected. A plurality of defective images in this folder may serve as a plurality of to-be-inspected images.

To inspect the availability of the algorithm of the visual inspection system, a plurality of to-be-inspected images of known defect types may be obtained directly from the specimen image library, and then compared with the images captured in real time by using the hardware of the visual inspection system, thereby avoiding the impact caused by the hardware device of the visual inspection system onto the inspection result, reducing the time of obtaining the to-be-inspected images, and in turn, improving the efficiency of spot-checking the algorithm of the visual inspection system.

According to some embodiments of this application, optionally, defect detection may be performed on each of the plurality of to-be-inspected images by using a defect detection algorithm in the visual inspection system, so as to obtain the defect types of the target object in each to-be-inspected image.

The defect detection algorithm may be stored in the data storage module 112 of the controller 110. When the to-be-inspected image needs to be inspected to detect defects, the to-be-inspected image is first preprocessed (such as binarized) by a computing module 111 in the controller 110 so as to extract defect features of the target object in the to-be-inspected image. The extracted defect features are compared with known defect features through a defect detection algorithm in the data storage module 112, so as to obtain the defect type of the target object in the to-be-inspected image.

By inspecting the defect types of each of the plurality of to-be-inspected images, this application can determine the robustness of the defect detection algorithm comprehensively based on the defect type inspection result of the plurality of to-be-inspected images, thereby improving accuracy of spot-checking the algorithm of the visual inspection system.

According to some embodiments of this application, optionally, if the defect types of the target object in each to-be-inspected image are identical to the known defect types, it is confirmed that a defect detection algorithm of the visual inspection system is available.

The defect types of the target object in each to-be-inspected image are compared with the corresponding known defect types. The known defect types mean true defect types of the target object in the to-be-inspected image. If the defect types are identical to the known defect types, it is confirmed that the defect detection algorithm in the visual inspection system is accurate and available. If a defect type inspection result of one of the plurality of to-be-inspected images is different from a known defect type, it is confirmed that the defect detection algorithm in the visual inspection system is of low robustness, and the defect detection algorithm in the visual inspection system is not available.

In the above implementation, the defect type inspection results of the target object in each of a plurality of to-be-inspected images are compared with the known defect types. When the defect type inspection results of all the to-be-inspected images are identical to the known defect types, it is confirmed that the defect detection algorithm of the visual inspection system is available, thereby improving the accuracy and effectiveness of the algorithm spot-checking.

According to some embodiments of this application, optionally, during obtaining of a plurality of to-be-inspected images in step 210, a standard target object inspection process may be run first, and then an image of the target object captured by the visual inspection system is obtained, so as to obtain the plurality of to-be-inspected images.

Understandably, the visual inspection system includes a plurality of cameras. Each camera corresponds to at least one light source. The cameras and light sources may be distributed at different positions of a production line to acquire images of target objects at different positions of the production line. During running of the standard target object inspection process, it is necessary to obtain images of the standard target object from a plurality of viewing angles or images of a plurality of surfaces of the standard target object. The standard target object is photographed by using a plurality of cameras in the visual inspection system to obtain the images from a plurality viewing angles or the images of a plurality of surfaces, so as to obtain a plurality of to-be-inspected images.

Understandably, the size of the standard target object and a grayscale value in a fixed lighting environment are fixed. In this embodiment of this application, the size and grayscale of the standard target object are recorded once. Subsequently, the standard target object inspection process needs to be run only once on each occasion of spot-checking the hardware of the visual inspection system. The inspection result is compared with the recorded information to determine a hardware spot-checking result, thereby improving the speed and efficiency of hardware spot-checking. When the hardware is spot-checked by using a non-standard target object, there may be countless types of non-standard target objects. In each spot-check, the parameters of the non-standard target object used in this spot-check needs to be recorded, thereby increasing the workload of hardware spot-checking and reducing the spot-checking efficiency.

During running of the standard target object inspection process, all cameras and light sources in the visual inspection system can be called. By inspecting the parameters of the target object in a plurality of to-be-inspected images captured by all cameras and light sources, the availability of each camera and light source can be determined based on the parameter inspection result, so as to confirm the availability of hardware of the visual inspection system.

According to some embodiments of this application, optionally, the target object may be a battery cell or a sheet film.

Understandably, in a production process of a product, not only the size or defects of a finished product need to be inspected, but also the components that make up the product may need to be inspected. For example, the target object may be a battery cell assembled and welded, or a battery plate that is an integral part of the battery cell. If the target object captured by some cameras is a component similar to a battery plate, a sheet film inspection process may be run. The availability of the cameras and the corresponding light sources is inspected by comparing the parameter inspection results of the sheet film with the true parameters.

Understandably, the parameters of a standard battery cell or a standard sheet film are fixed. When the detected parameters are different from or deviate greatly from the parameters of a standard battery cell or a standard sheet film, it is confirmed that the hardware of the visual inspection system is unavailable.

According to some embodiments of this application, optionally, parameter measurement is performed on each of the plurality of to-be-inspected images through the visual inspection system, so as to obtain the parameters of the target object in each to-be-inspected image.

Understandably, the plurality of to-be-inspected images used in the spot-check of the hardware of the visual inspection system are photos taken by all cameras of the visual inspection system. A parameter inspection result of the target object in each to-be-inspected image can be obtained through the parameter measurement for each to-be-inspected image. Based on the parameter inspection result of each to-be-inspected image, the availability of the cameras and light sources corresponding to each to-be-inspected image can be spot-checked.

Through the parameter measurement for each to-be-inspected image, a parameter measurement result of the target object in each to-be-inspected image can be obtained. The availability of the hardware corresponding to each to-be-inspected image can be determined based on the parameter measurement result of each to-be-inspected image.

According to some embodiments of this application, optionally, the parameters may include a size and a grayscale of the target object.

When the position of a camera of the visual inspection system changes, the size of the target object will change, as indicated by the measured size of the to-be-inspected image of the target object photographed by this camera. The principle is that, the length and width of the target object are determined by calculating the measured number of pixels included in the long side or wide side of the target object. Specifically, the length is obtained by multiplying the width of each pixel by the number of pixels included in the long side of the target object, and the width is obtained by multiplying the width of each pixel by the number of pixels included in the short side of the target object. Therefore, for a target object closer to a specimen holder when the camera position is compared with a standard camera position, the number of pixels included in the image of the target object is larger, and therefore, the measured size of the target object is larger than the actual size. Conversely, for a target object farther away from a specimen holder when the camera position is compared with a standard camera position, the number of pixels included in the image of the target object is smaller, and therefore, the measured size of the target object is smaller than the actual size. Therefore, based on the size parameter information of the target object, it can be determined whether the camera position of the visual inspection system has changed.

When the level of illumination provided by the light source in the visual inspection system changes excessively in comparison with a standard level of illumination, a slight impact will be caused onto the size measurement. For example, overexposure will indent the edge of an imaged target object, and make the measured size value smaller. Based on the grayscale parameter information of the target object, it can be determined whether the light source of the visual inspection system has changed.

By inspecting the size and grayscale of the target object in each to-be-inspected image, whether the camera and light source corresponding to each to-be-inspected image have changed can be inspected separately, so as to confirm the availability of the hardware of the visual inspection system.

According to some embodiments of this application, optionally, if the parameters of the target object in each to-be-inspected image are consistent with true parameters, it is confirmed that the hardware of the visual inspection system is available.

The consistency between the parameters of the target object in each to-be-inspected image and the true parameters may mean complete identicalness between the parameter measurement result and the true parameters, or mean that a difference between the parameter measurement result and the true parameters is less than a preset threshold. The setting the threshold can meet different accuracy requirements of different users for the measurement data. In practical implementation, the parameter measurement result may be compared with the expected result to confirm the availability of the hardware of the visual inspection system. The expected result may be a range formed by the true parameters and the preset threshold.

By checking whether the parameters of the target object in each to-be-inspected image are consistent with the true parameters, it can be determined whether the hardware corresponding to each to-be-inspected image is available, so as to confirm the availability of the hardware of the visual inspection system.

According to some embodiments of this application, optionally, the hardware includes a plurality of cameras and a plurality of light sources.

Understandably, what is usually changed in the hardware of the visual inspection system is the position of the camera and the lighting conditions of the light source. By comparing the parameter inspection result with the size and grayscale information in the true parameters, it can be determined whether the camera position of the visual inspection system and the lighting conditions of the light source have changed. In this way, the availability of the hardware of the visual inspection system is confirmed.

According to some embodiments of this application, optionally, before the obtaining a plurality of to-be-inspected images, the method further includes: receiving an instruction to select a camera; and setting the true parameters of the target object corresponding to the camera.

Understandably, when the hardware of the visual inspection system is spot-checked for a first time, the true parameters that each camera is expected to obtain under the standard hardware conditions of the visual inspection system need to be recorded or set. By receiving the instruction to select a camera, the parameters that the camera is expected to obtain (true parameters) can be set. Therefore, the true parameters are compared with the parameter measurement result of the to-be-inspected image captured by each camera, so as to determine the accuracy of the data provided for the algorithm by the camera and the light source corresponding to the camera, and in turn, confirm the availability of the hardware.

Further understandably, when the hardware of the visual inspection system is spot-checked for other than the first time, that is, when the true parameters corresponding to each camera have been recorded or set and the hardware has not been adjusted, the parameters do not need to be set. If the hardware has been adjusted, it is necessary to set the true parameters corresponding to the camera, so as to ensure accuracy of the spot-check.

It is hereby noted that the visual inspection system is further configured to inspect a connection relationship between components. For example, a visual inspection system for batteries includes a cathode welding camera configured to check whether the position of welding between a cathode adapter of the battery and other components is correct. Therefore, the parameters of the to-be-inspected image corresponding to the camera may further include a corner position, weld area, and other information of the standard cathode adapter. By inspecting the parameters such as the corner position and weld area of the standard cathode adapter, it can be determined whether the position of the cathode welding camera has changed. Therefore, depending on camera functions of the visual inspection system, other parameters different from the size and grayscale are set for the camera, and the corresponding parameters of the camera are measured during the spot-checking.

According to some embodiments of this application, optionally, the number of times that the camera is to be spot-checked is set.

Generally, the number of times that each camera is to be spot-checked is set to 1 by default, thereby meeting the basic spot-check requirements. To improve the accuracy of spot-checking, a camera is selected, and the number of times of spot-checking the camera and the light source corresponding to the camera is set or adjusted.

Figure 3:
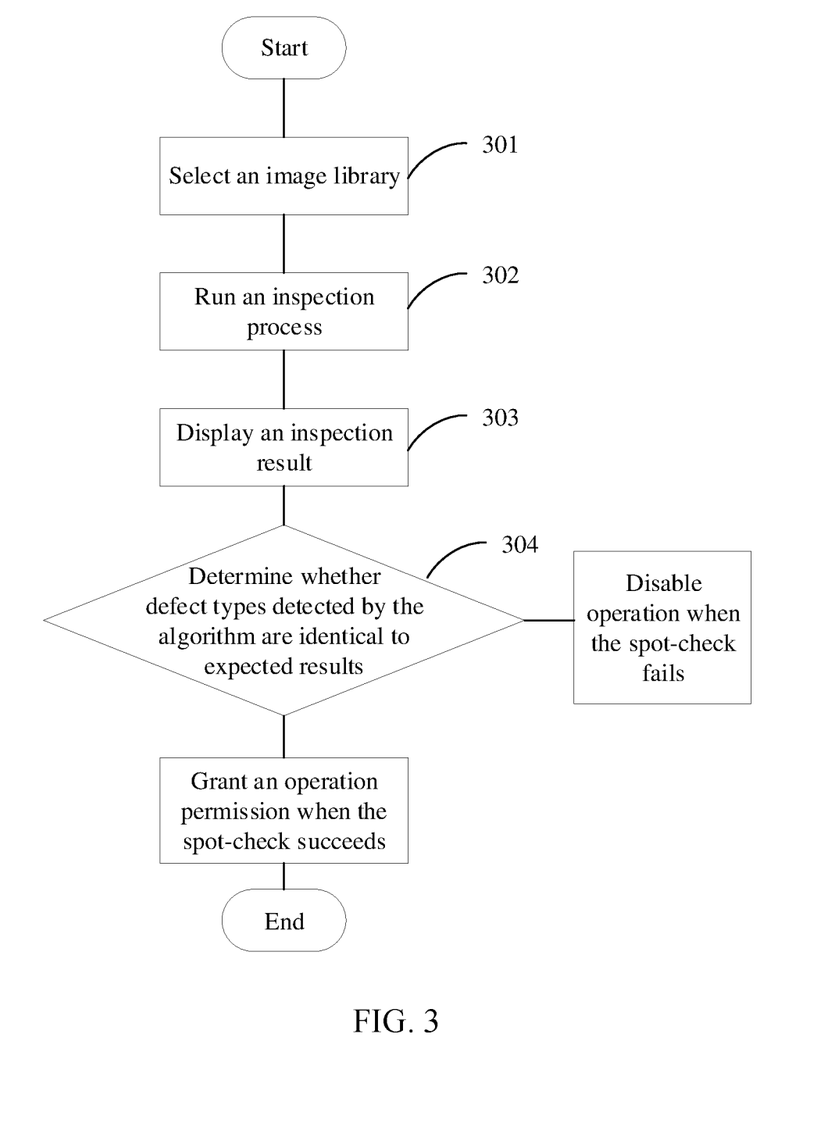
FIG. 3 is a schematic flowchart of a method for spot-checking an algorithm of a visual inspection system according to an embodiment of this application.

FIG. 3 is a schematic flowchart of a method 300 for spot-checking an algorithm of a visual inspection system according to an embodiment of this application.

As shown in FIG. 3, the method 300 for spot-checking the algorithm of the visual inspection system includes the following steps:

301. Selecting an image library.

Specifically, the user may select an image library through an interactive interface in a controller 110 to obtain a plurality of to-be-inspected images. The image library includes a plurality of to-be-inspected images. The defect types of a target object in each to-be-inspected image are known. The image library may be a folder in a specimen image library of the data storage module 112. Definitely, the image library may be a default folder, without requiring the user to select.

302. Running an inspection process.

Specifically, after the user selects an image library, the user may click/tap a "Start" button on the interactive interface. After receiving this instruction to start inspection, the controller 110 of the visual inspection system calls code of a defect detection algorithm to perform defect detection on a plurality of to-be-inspected images in the image library, so as to obtain the defect types of the target object in each to-be-inspected image.

Optionally, before calling the code of the defect detection algorithm to perform defect detection on the to-be-inspected image, the to-be-inspected image may be preprocessed, so as to extract defect features more accurately, thereby improving the accuracy of defect detection.

303. Displaying an inspection result.

Specifically, the defect type inspection result of the target object in each to-be-inspected image, which is obtained in step 302, may be displayed on the interactive interface. The known defect types (true defect types) of each to-be-inspected image may also be displayed on the interface correspondingly, so that the user can view the defect type comparison results conveniently.

304. Determining whether the defect types detected by the algorithm are identical to expected results.

Specifically, the availability of the algorithm of the visual inspection system is confirmed by whether the detected defect types are identical to the known defect types. If the inspection result of each to-be-inspected image is identical to the expected result, the algorithm of the visual inspection system succeeds in the spot-check. In this case, the permission to run the algorithm of the visual inspection system may be granted. If the inspection result is not identical to the expected result, the algorithm of the visual inspection system fails the spot-check. In this case, the algorithm of the visual inspection system is disabled. Optionally, when the algorithm fails the spot-check, an alert signal may pop up on the interface, so that the user can take corresponding actions based on the result of the spot-check failure. For example, a technician may check for errors in the algorithm code, so as to ensure the accuracy of the algorithm inspection result.

In the above implementation, the user needs to just select an image library and click/tap the "Start" button to implement the automatic spot-check for the algorithm of the visual inspection system.

Figure 4:
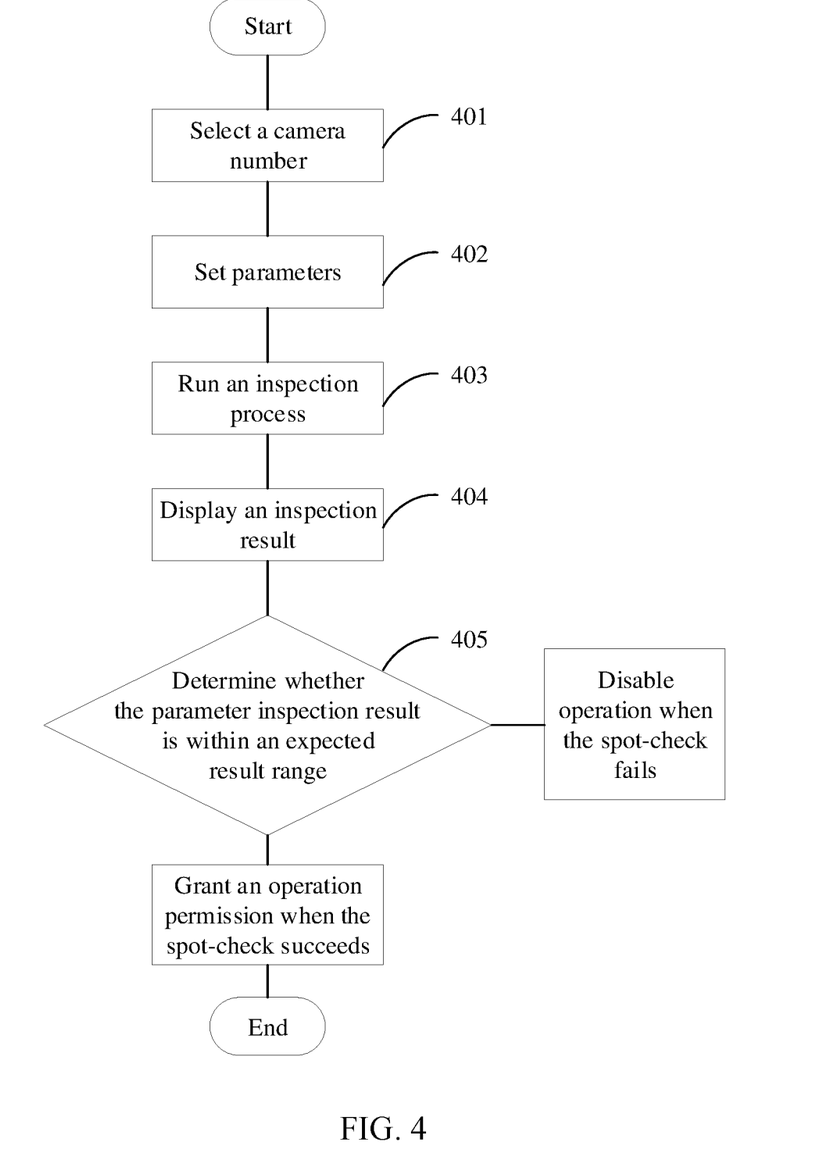
FIG. 4 is a schematic flowchart of a method for spot-checking hardware of a visual inspection system according to an embodiment of this application.

FIG. 4 is a schematic flowchart of a method 400 for spot-checking hardware of a visual inspection system according to an embodiment of this application.

As shown in FIG. 4, the method 400 for spot-checking hardware of the visual inspection system includes the following steps:

401. Selecting a camera number.

Specifically, the user may select a camera number on an interactive interface, and set the number of times that each camera is to inspect, and the true parameters of the target object under the camera.

402. Setting parameters.

Specifically, after the camera number is selected, the user may set the true parameters of the target object under the camera. The camera at the standard position and the size and grayscale of the target object under lighting conditions are set as true parameters.

403. Running an inspection process.

Specifically, after the true parameters of the target object under each camera are set, a standard inspection process of battery cells or sheet films is run.

404. Displaying an inspection result.

Specifically, after the inspection process is run, the visual inspection system captures a plurality of to-be-inspected images through all cameras, and then inspects the parameters of the battery cell or sheet film in the plurality of to-be-inspected images, and displays a parameter inspection result on the interactive interface. The visual inspection system may also display the true parameters of the target object of each to-be-inspected image on the interactive interface at the same time, so that the user can view the parameter inspection comparison results.

405. Determining whether the parameter inspection result falls within an expected result range.

Specifically, if the parameter inspection result of each to-be-inspected image falls within the expected range, the data provided by the hardware of the visual inspection system for the algorithm is accurate, that is, the hardware of the visual inspection algorithm is available. In this case, the spot-check succeeds, and the permission to run the hardware of the visual inspection system may be granted. If a parameter inspection result of a to-be-inspected image falls outside the expected range, the data provided by the camera and/or light source corresponding to the to-be-inspected image is inaccurate or deviated, that is, the hardware of the visual inspection system is not available. In this case, the spot-check fails, and the hardware of the visual inspection system may be disabled.

Optionally, the result displayed on the interactive interface of hardware spot-check is an overall spot-check result of all cameras and corresponding light sources. The user may select a camera number to view the spot-check result corresponding to a camera.

In the above implementation, on condition that the user has set the true parameters corresponding to each camera, the user needs to just click/tap the "Start" button to implement the automatic spot-check for the hardware of the visual inspection system.

The foregoing has described in detail the method embodiment according to an embodiment of this application. The following describes an apparatus embodiment according to an embodiment of this application. The apparatus embodiment corresponds to the method embodiment, and therefore, for the content not described in detail in the apparatus embodiment, reference may be made to the preceding method embodiment. The apparatus can implement any possible implementation in the foregoing method.

Figure 5:
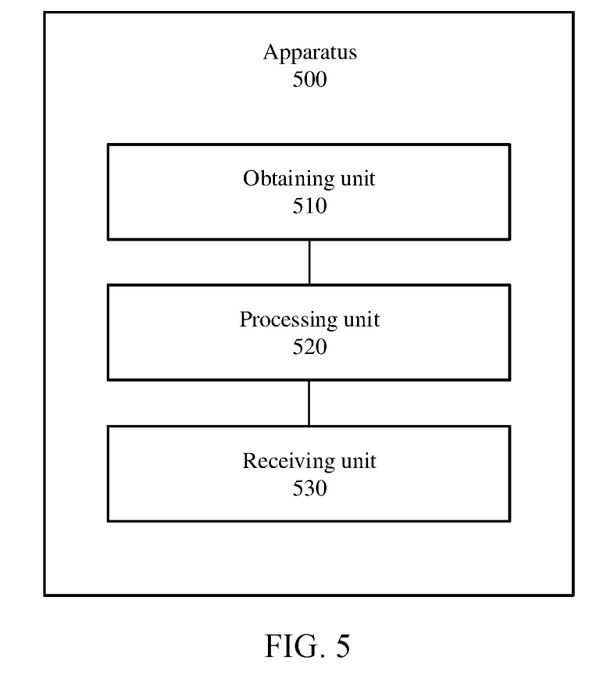
FIG. 5 is a schematic structural block diagram of an apparatus for inspecting stability of a visual system according to an embodiment of this application.

FIG. 5 is a schematic block diagram of an apparatus 500 for spot-checking a visual inspection system according to an embodiment of this application. The spot-checking apparatus 500 can perform the foregoing method for spot-checking a visual inspection system according to an embodiment of this application. For example, the spot-checking apparatus 500 may be the controller 110 described above.

As shown in FIG. 5, the spot-checking apparatus 500 includes:

an obtaining unit 510, configured to obtain a plurality of to-be-inspected images; and a processing unit 520, configured to inspect the plurality of to-be-inspected images to obtain defect types and/or parameters of a target object in the plurality of to-be-inspected images; and confirm availability of the visual inspection system based on the defect types and/or parameters.

According to some embodiments of this application, optionally, the obtaining unit 510 is configured to obtain the plurality of to-be-inspected images from a specimen image library. The defect types of each image in the specimen image library are known.

According to some embodiments of this application, optionally, the processing unit 520 is configured to: perform defect detection on each of the plurality of to-be-inspected images by using a defect detection algorithm in the visual inspection system, so as to obtain the defect types of the target object in each to-be-inspected image.

According to some embodiments of this application, optionally, if the defect types of the target object in each to-be-inspected image are identical to the known defect types, the processing unit 520 is configured to confirm that the defect detection algorithm of the visual inspection system is available.

According to some embodiments of this application, optionally, the processing unit 520 is configured to run a standard target object inspection process, and the obtaining unit 510 is configured to obtain an image of the target object captured by the visual inspection system, so as to obtain the plurality of to-be-inspected images.

According to some embodiments of this application, optionally, the target object is a battery cell or a sheet film.

According to some embodiments of this application, optionally, the processing unit 520 is configured to: perform parameter measurement on each of the plurality of to-be-inspected images through the visual inspection system, so as to obtain the parameters of the target object in each to-be-inspected image.

According to some embodiments of this application, optionally, the parameters include a size and a grayscale of the target object.

According to some embodiments of this application, optionally, if the parameters of the target object in each to-be-inspected image are consistent with true parameters, the processing unit 520 is configured to confirm that the hardware of the visual inspection system is available.

According to some embodiments of this application, optionally, the hardware includes a plurality of cameras and a plurality of light sources.

According to some embodiments of this application, optionally, the spot-checking apparatus 500 further includes a receiving unit 530. The receiving unit 530 is configured to receive the instruction to select a camera. The processing unit 520 is further configured to set the true parameters of the target object corresponding to the camera.

According to some embodiments of this application, optionally, the processing unit 520 is further configured to set the number of times that the camera is to be spot-checked.

Figure 6:
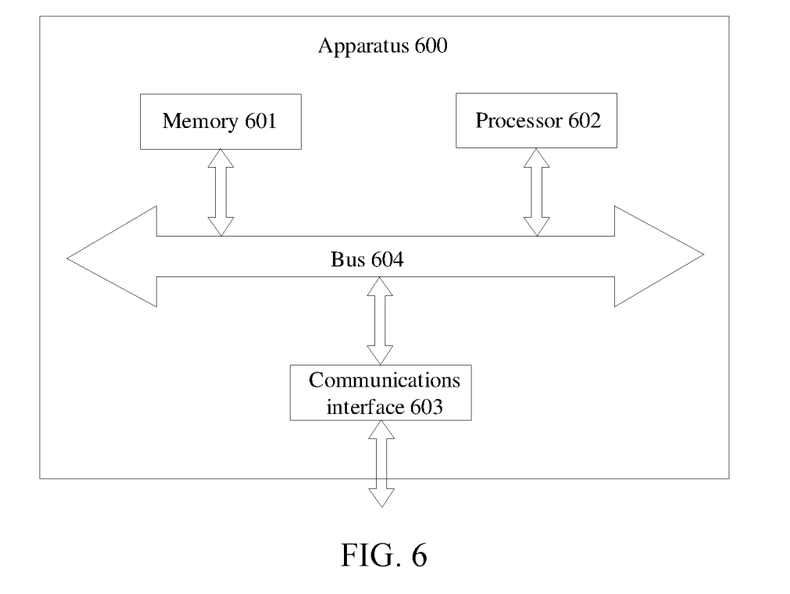
FIG. 6 is a schematic diagram of a hardware structure of an apparatus for inspecting stability of a visual system according to an embodiment of this application.

FIG. 6 is a schematic diagram of a hardware structure of an apparatus for inspecting availability of a visual inspection system according to an embodiment of this application. The apparatus 600 for inspecting availability of a visual inspection system in FIG. 6 includes a memory 601, a processor 602, a communications interface 603, and a bus 604. The memory 601, the processor 602, and the communications interface 603 are connected to each other by the bus 604 to implement communications connection between each other.

The memory 601 may be a read-only memory (ROM), a static storage device, or a random access memory (RAM). The memory 601 may store a program. When the program stored in the memory 601 is executed by the processor 602, the processor 602 and the communications interface 603 are configured to perform steps of the method for spot-checking a visual inspection system according to an embodiment of this application.

The processor 602 may be a general-purpose central processing unit (CPU), a microprocessor, an application specific integrated circuit (ASIC), a graphics processing unit (GPU), or one or more integrated circuits. The processor is configured to perform relevant programs to implement the functions of units in the apparatus for inspecting availability of a visual inspection system according to an embodiment of this application or perform the method for spot-checking a visual inspection system according to an embodiment of this application.

Alternatively, the processor 602 may be an integrated circuit chip capable of processing signals. In an implementation process, steps of the method for spot-checking a visual inspection system according to an embodiment of this application may be performed by an integrated logic circuit in the hardware form or an instruction in the software form in the processor 602.

The processor 602 may be a general-purpose processor, a digital signal processor (DSP), an ASIC, a field programmable gate array (FPGA), or another programmable logic device, a discrete gate, or a transistor logic device, or a discrete hardware component. The processor can implement or perform the methods, steps, and logic block diagrams disclosed in an embodiment of this application. The general-purpose processor may be a microprocessor, or the processor may be any conventional processor or the like. The steps of the method disclosed in an embodiment of this application may be directly performed by a hardware processor, or performed by a combination of hardware and software modules in the processor. A software module may be located in a mature storage medium in the art, such as a random access memory, a flash memory, a read-only memory, a programmable read-only memory, an electrically erasable programmable memory, a register, or the like. The storage medium is located in the memory 601. The processor 602 reads the information in the memory 601, and works together with hardware to perform the functions of the units included in the apparatus for inspecting availability of a visual inspection system according to an embodiment of this application, or perform the method for spot-checking a visual inspection system according to an embodiment of this application.

The communications interface 603 may use, but without limitation, a transmitting and receiving apparatus such as a transceiver to implement communication between the apparatus 600 and another device or a communications network. For example, traffic data of an unknown device may be obtained through the communications interface 603.

The bus 604 may include a path configured to transfer information between components (for example, memory 601, processor 602, and communications interface 603) of the apparatus 600.

It is hereby noted that although the apparatus 600 shown in the drawing includes just a memory, a processor, and a communications interface, a person skilled in the art understands that the apparatus 600 in specific implementations may include other components required for normal operation. In addition, a person skilled in the art understands that the apparatus 600 may further include a hardware component configured to implement another additional function as specifically required. Moreover, a person skilled in the art understands that the apparatus 600 may include just the components necessary to implement an embodiment of this application, but without including all components shown in FIG. 6.

An embodiment of this application further provides a computer-readable storage medium configured to store program code executable by a device. The program code includes an instruction to perform the steps of the method for spot-checking a visual inspection system.

An embodiment of this application further provides a computer program product. The computer program product includes a computer program stored on a computer-readable storage medium. The computer program includes a program instruction. When executed on a computer, the program instruction causes the computer to perform the method for spot-checking a visual inspection system.

The computer-readable storage medium may be a transitory computer-readable medium or a non-transitory computer-readable storage medium.

A person skilled in the art is clearly aware that for convenience and brevity of description, a detailed working process of the apparatus described above may be learned by referring to the corresponding process in the foregoing method embodiment, details of which are omitted here.

Before step 210, the apparatus for inspecting availability of a visual inspection system may receive a device control instruction from the user. In some embodiments, a host computer 110 includes a display screen, and the apparatus for inspecting availability of a visual inspection system may display an inspection interface on the display screen of the host computer 110. The inspection interface includes tabs corresponding to a plurality of devices. By operating the tabs on the inspection interface, the user inputs a plurality of device control instructions into the host computer 110, so that an inspection apparatus in the host computer 110 receives the control instructions corresponding to the plurality of devices.

Although this application has been described with reference to illustrative embodiments, various improvements may be made to the embodiments without departing from the scope of this application, and the components in this application may be replaced with equivalents. Particularly, to the extent that no structural conflict exists, various technical features mentioned in different embodiments may be combined in any manner. This application is not limited to the specific embodiments disclosed herein, but includes all technical solutions falling within the scope of the claims.

What is claimed is:

1. A spot-checking method for a visual inspection system, comprising:
   obtaining a plurality of to-be-inspected images;
   inspecting the plurality of to-be-inspected images to obtain defect types and/or parameters of a target object in the plurality of to-be-inspected images, comprising:

determining a size of the target object in each of the plurality of to-be-inspected images by calculating a number of pixels included in the target object in the each of the plurality of to-be-inspected images; and confirming availability of the visual inspection system based on the defect types and/or the parameters, comprising:

confirming the availability of the visual inspection system by comparing the number of pixels included in the target object in each of the plurality of to-be-inspected images with a threshold.

2. The spot-checking method according to claim 1, wherein obtaining the plurality of to-be-inspected images comprises:

obtaining the plurality of to-be-inspected images from a specimen image library, wherein a defect type of each image in the specimen image library is known.

3. The spot-checking method according to claim 1, wherein inspecting the plurality of to-be-inspected images to obtain defect types and/or the parameters of the target object in the plurality of to-be-inspected images further comprises:

performing defect detection on the plurality of to-be-inspected images by using a defect detection algorithm in the visual inspection system, to obtain the defect types of the target object in the plurality of to-be-inspected images.

4. The spot-checking method according to claim 1, wherein confirming the availability of the visual inspection system based on the defect types and/or the parameters further comprises:

confirming, in response to the defect type of the target object in each of the plurality of to-be-inspected images being identical to a known defect type, that a defect detection algorithm of the visual inspection system is available.

5. The spot-checking method according to claim 1, wherein obtaining the plurality of to-be-inspected images comprises:

running a standard target object inspection process; and
obtaining images of the target object captured by the visual inspection system as the plurality of to-be-inspected images.

6. The spot-checking method according to claim 1, wherein the target object includes a battery cell or a sheet film.

7. The spot-checking method according to claim 1, wherein inspecting the plurality of to-be-inspected images to obtain the defect types and/or the parameters of the target object in the plurality of to-be-inspected images further comprises:

performing grayscale measurement on each of the plurality of to-be-inspected images through the visual inspection system, to obtain grayscale of the target object in each of the plurality of to-be-inspected images.

8. The spot-checking method according to claim 1, wherein confirming the availability of the visual inspection system based on the defect types and/or the parameters further comprises:

confirming, in response to the size of the target object in each of the plurality of to-be-inspected images being consistent with the threshold, that hardware of the visual inspection system is available.

9. The spot-checking method according to claim 8, wherein the hardware comprises a plurality of cameras and a plurality of light sources.

10. The spot-checking method according to claim 9, further comprising, before obtaining the plurality of to-be-inspected images:

receiving a selection instruction of a camera; and
setting the threshold of the target object corresponding to the camera.

11. The spot-checking method according to claim 10, further comprising:

setting a number of times that the camera is to be spot-checked.

12. A non-transitory computer-readable storage medium storing a computer program that, when executed on a computer, causes the computer to perform the spot-checking method according to claim 1.

13. A spot-checking apparatus for a visual inspection system, comprising:

an obtaining unit, configured to obtain a plurality of to-be-inspected images; and
a processing unit, configured to:
inspect the plurality of to-be-inspected images to obtain defect types and/or parameters of a target object in the plurality of to-be-inspected images, comprising:
determining a size of the target object in each of the plurality of to-be-inspected images by calculating a number of pixels included in the target object in the each of the plurality of to-be-inspected images; and
confirm availability of the visual inspection system based on the defect types and/or the parameters, comprising:
confirming the availability of the visual inspection system by comparing the number of pixels included in the target object in each of the plurality of to-be-inspected images with a threshold.

14. The spot-checking apparatus according to claim 13, wherein the obtaining unit is further configured to obtain the plurality of to-be-inspected images from a specimen image library, wherein a defect type of each image in the specimen image library is known.

15. The spot-checking apparatus according to claim 13, wherein the processing unit is further configured to:

perform defect detection on the plurality of to-be-inspected images by using a defect detection algorithm in the visual inspection system, to obtain the defect types of the target object in the plurality of to-be-inspected images.

16. The spot-checking apparatus according to claim 13, wherein the processing unit is further configured to:

confirm, in response to the defect type of the target object in each of the plurality of to-be-inspected images being identical to a known defect type, that a defect detection algorithm of the visual inspection system is available.

17. The spot-checking apparatus according to claim 13, wherein:

the processing unit is further configured to run a standard target object inspection process; and
the obtaining unit is further configured to obtain images of the target object captured by the visual inspection system as the plurality of to-be-inspected images.

18. The spot-checking apparatus according to claim 13, wherein the processing unit is further configured to:

perform grayscale measurement on each of the plurality of to-be-inspected images through the visual inspection system, to obtain grayscale of the target object in each of the plurality of to-be-inspected images.

19. A spot-checking apparatus for a visual inspection system, comprising:
- a memory storing a program; and
- a processor configured to call the program from the memory and run the program to:
  - obtain a plurality of to-be-inspected images;
  - inspect the plurality of to-be-inspected images to obtain defect types and/or parameters of a target object in the plurality of to-be-inspected images, comprising:
    - determining a size of the target object in each of the plurality of to-be-inspected images by calculating a number of pixels included in the target object in the each of the plurality of to-be-inspected images; and
  - confirm availability of the visual inspection system based on the defect types and/or the parameters, comprising:
    - confirming the availability of the visual inspection system by comparing the number of pixels included in the target object in each of the plurality of to-be-inspected images with a threshold.

20. The spot-checking method according to claim 1, wherein the threshold comprises a number of pixels included in the target object in an image captured by a camera at a standard position.

* * * * *